L. W. TIBYRICÁ.
CONVEYER.
APPLICATION FILED DEC. 13, 1912.
1,080,501.
Patented Dec. 2, 1913.
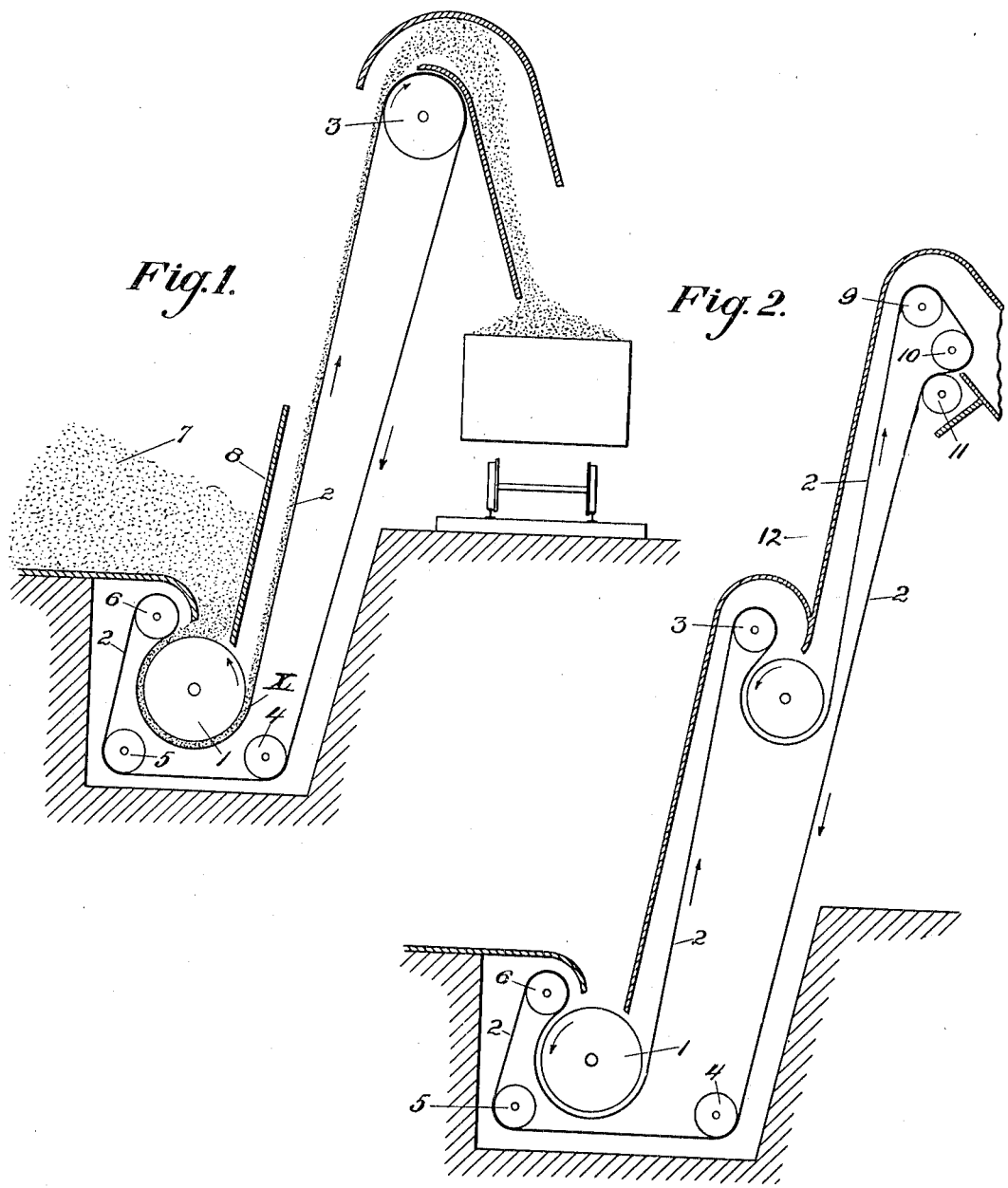

ically, may be employed according to the re-

UNITED STATES PATENT OFFICE.

LUIZ W. TIBYRIÇÁ, OF SÃO PAULO, BRAZIL.

CONVEYER.

1,080,501.  Specification of Letters Patent.  Patented Dec. 2, 1913.

Application filed December 13, 1912. Serial No. 736,453.

*To all whom it may concern:*

Be it known that I, LUIZ W. TIBYRIÇÁ, a citizen of the Republic of Brazil, South America, residing in the city of São Paulo, Brazil, South America, have invented a certain new and useful Improvement in Conveyers, of which the following is a specification.

This invention comprises an organization wherein an endless conveyer belt is driven through the medium of a driving drum at a relatively high velocity and in which the material to be elevated such, for instance, as coal, sand, gravel, grain, etc., has imparted to it a velocity the same or substantially so, as that of the belt by feeding such material between the driving drum and the belt so that it passes around with the drum belt between the two. Experience has demonstrated that with an organization having this characteristic, the persistent velocity of the material and contact with the surface of the belt after leaving the drum permits of its being raised to substantial elevations in a line removed but a few degrees from the vertical, the elevating belt being disposed at such angle that the centrifugal force set up in the material tends to maintain it in contact with the surface of the belt.

In the accompanying drawings: Figure 1 is a somewhat diagrammatic elevation: and Fig. 2, a similar view showing an intermediate or relay driving drum by means of which a further elevation of the material may be effected.

1 indicates a driving drum to be driven in any appropriate way from any suitable source of power. An endless conveyer belt or band 2 passes around the driven drum from a point adjacent the top of the periphery; thence upward, with an inclination away from the vertical plane in which the axis of the drum lies, over an idler or driven roll 3; thence down around idlers 4, 5, 6 to the initial point. The material 7 to be elevated is fed from a receptacle or hopper upon the top of the drum which is driven in the direction indicated by the arrow and passes between the drum and the belt leaving the drum tangentially at X with a centrifugal tendency so move toward the belt. At the roll 3 the material is discharged into a chute of guide way that delivers it to a car or receptacle.

Fig. 2 indicates a relay system in which the material rising with the belt to the upper roll 3, is directed by a guide upon the top of a second driven drum under which the endless conveyer belt runs and between which and the belt the material to be elevated passes. The material finally leaves the belt at the upper idler or driven roll 9 from which the belt passes to and over idlers 10, 11, and thence downwardly as in Fig. 1 to the idler 4. Suitable guards or casings such as 8 and 12, may be provided as occasion may render desirable or necessary.

The belt for most purposes may be one of ordinary canvas and need not be provided with any greater roughness of surface or protuberance of points on the surface than is afforded by the weave of the fabric. Of course, any appropriate material and character of surface, whether inherent or artificial, may be employed according to the requirements of use.

I claim:

An elevating conveyer comprising a driving drum, an endless belt passing part way around the drum and upwardly therefrom with an inclination away from the vertical plane in which the axis of the drum lies, and means for feeding material to be elevated between the belt and drum.

In testimony whereof, I have hereunto subscribed my name.

LUIZ W. TIBYRIÇÁ.

Witnesses:
J. W. HUTCHINSON,
C. C. MACKENHIS.